United States Patent [19]
Takeuchi

[11] Patent Number: 6,043,908
[45] Date of Patent: Mar. 28, 2000

[54] IMAGE READER FOR FACSIMILE MACHINE

[75] Inventor: Masaru Takeuchi, Handa, Japan

[73] Assignee: Brother Kogyo Kabushiki Kaisha, Nagoya, Japan

[21] Appl. No.: 08/998,822

[22] Filed: Dec. 29, 1997

[30] Foreign Application Priority Data

Jan. 6, 1997 [JP] Japan .................................. 9-000312
Jan. 6, 1997 [JP] Japan .................................. 9-000313

[51] Int. Cl.[7] .............................. H04N 1/04; H04N 1/00
[52] U.S. Cl. ........................... 358/496; 358/400; 358/471
[58] Field of Search ................................ 358/400, 474, 358/496, 498, 471, 486, 483; 382/312; 250/208.1, 234–236; 399/104, 343, 379, 380; 355/75

[56] References Cited

U.S. PATENT DOCUMENTS

| | | | |
|---|---|---|---|
| 5,260,750 | 11/1993 | Ishida et al. | 399/262 |
| 5,452,098 | 9/1995 | Sato et al. | 358/400 |
| 5,468,943 | 11/1995 | Gatto et al. | 358/496 |
| 5,579,128 | 11/1996 | Cheng | 358/471 |
| 5,805,307 | 9/1998 | Park | 358/471 |
| 5,860,042 | 1/1999 | Tomaru et al. | 399/92 |
| 5,867,283 | 2/1999 | Nam | 358/498 |

*Primary Examiner*—Cheukfan Lee
*Attorney, Agent, or Firm*—Oliff & Berridge, PLC

[57] ABSTRACT

An image reader for facsimile machines etc. includes an image sensor, a platen movable to and from the image sensor and having an end, and a locking mechanism capable of holding the platen in a state pressed against the image sensor. The locking mechanism includes a platen support for rotatably supporting the end of the platen, and a rotatable support supporting the platen support so that the platen is allowed to move to and from the image sensor, the rotatable support disallowing the platen to move to and from the image sensor so that the platen is held in the state pressed against the image sensor, when the platen support is rotatively moved in a predetermined direction.

11 Claims, 7 Drawing Sheets

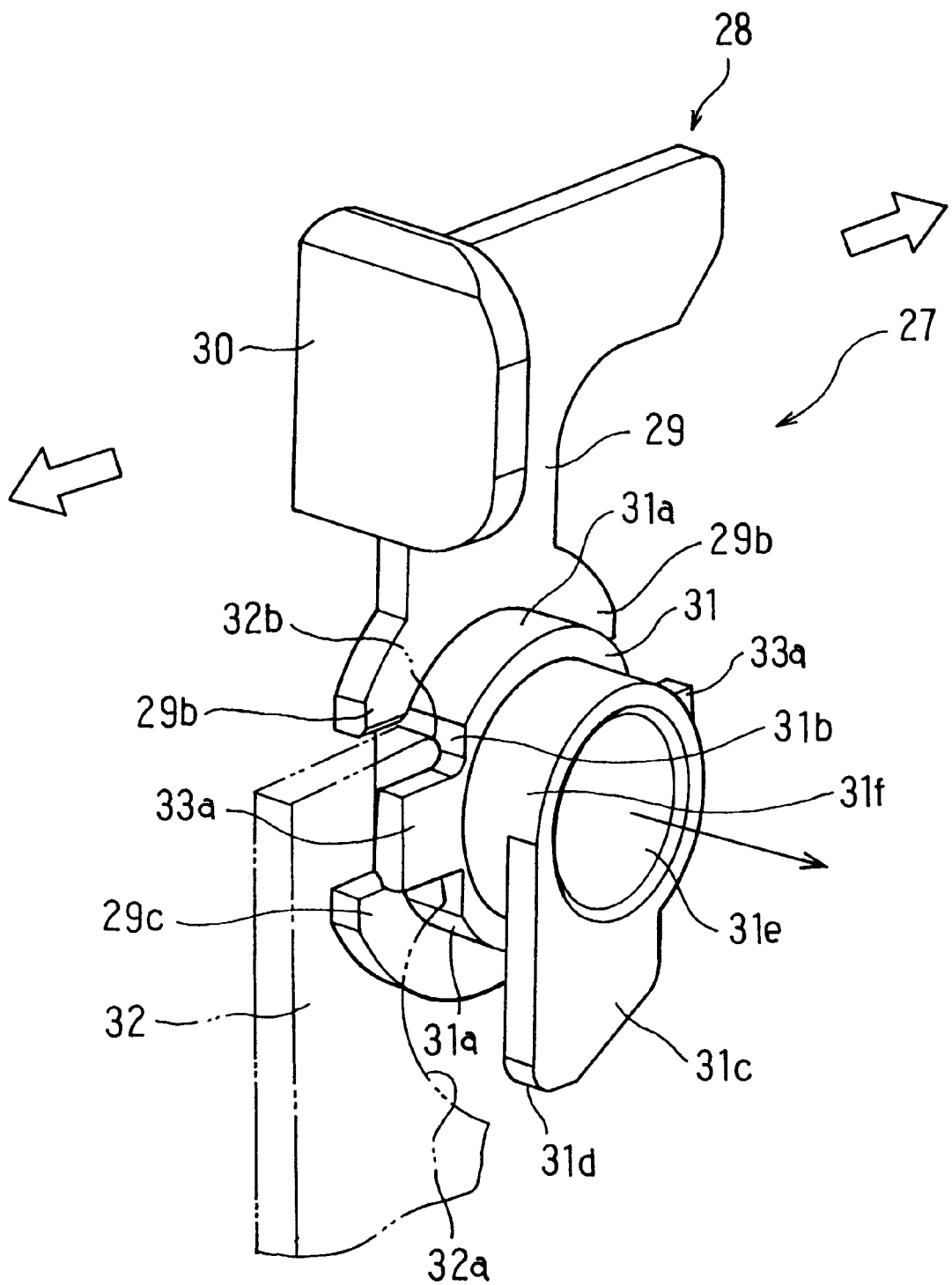
F I G. 1

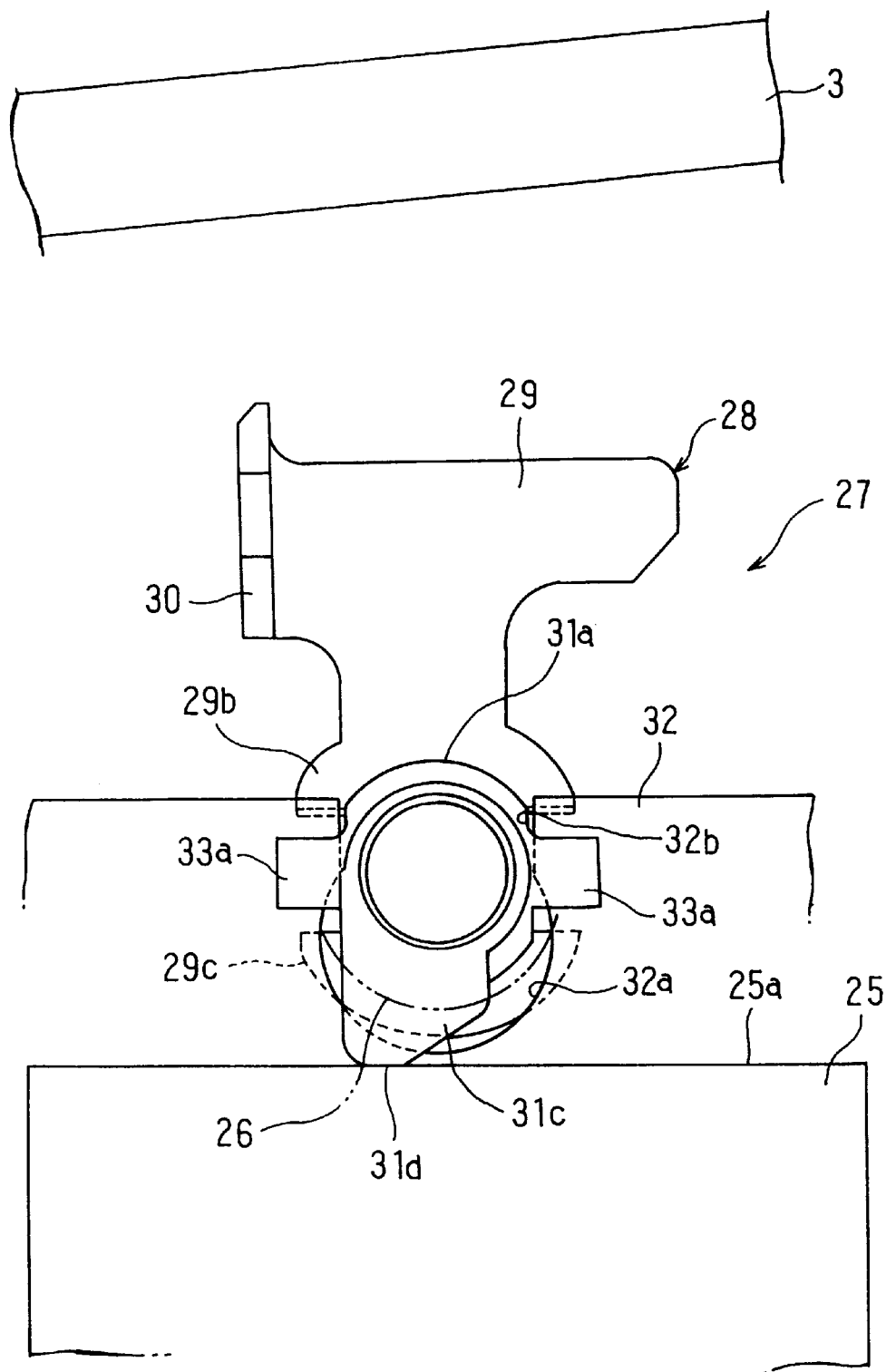
F I G. 5

IMAGE READER FOR FACSIMILE MACHINE

BACKGROUND OF THE INVENTION

1. Field of the Invention

This invention relates generally to an image reader suitable for use in facsimile machines, and more particularly to such an image reader having a locking mechanism capable of holding a platen in a state pressed against an image sensor.

2. Description of the Related Art

A facsimile machine for transmitting and receiving via telephone line images such as characters or figures described or illustrated on one or more original sheets generally comprises an image reader for reading images on the original as image information, a printer for printing the read image information on paper, and a transmission-reception device for transmitting and receiving via the telephone line the image information. The image reader includes an image sensor transversely disposed along a width of the original and a platen disposed to be pushed against the image sensor. In the image reader, the original carrying the images to be read is fed between the platen and the image sensor. The platen is then rotated to feed the original lengthwise so that images contained per line on the original are sequentially read by the image sensor. Thus, overall image information contained in the original is read by the image sensor. In this image reading manner, an accuracy in reading the image information is sometimes reduced when the original rises relative to the image sensor or when the image sensor becomes dirty.

To solve the above-described problem, the prior art has provided a locking mechanism for holding the platen in a state pressed against the image sensor. The locking mechanism comprises a pair of platen supports for rotatably supporting both ends of the platen respectively and a shaft disposed along the platen to connect between the platen supports. The locking mechanism is capable of rotatively moving upwardly and downwardly the platen supports and accordingly, the platen with the shaft as the center of rotation. Furthermore, the locking mechanism holds the platen supports at a lower limit position where the platen is pressed against the image sensor. In the reading of images, the platen supports are lowered to the lower limit position so that a platen roller is held pushed against the image sensor. Thus, the original can be prevented from abruptly rising. On the other hand, when the image sensor becomes dirty or when the facsimile machine has been clogged up with paper, the platen is manually lifted up together with the platen supports so that the platen is departed from the image sensor. Consequently, the image sensor etc. can be cleaned or the paper clogging the facsimile machine can be removed.

In the above-described image reader, however, the shaft is disposed along the platen to connect between the pair of platen supports. Accordingly, the shaft has approximately the same length as the platen. A space is required in order that the shaft may be disposed along the platen. This results in an increase in the size of the image reader and accordingly, that of the facsimile machine incorporated with the image reader.

SUMMARY OF THE INVENTION

Therefore, an object of the present invention is to provide an image reader wherein sizes of component parts of the locking mechanism and spaces for disposition of the component parts can be reduced such that the overall size of the image reader can be reduced.

The present invention provides an image reader comprising an image sensor, a platen movable to and from the image sensor and having an end, and a locking mechanism capable of holding the platen in a state pressed against the image sensor. The locking mechanism includes a platen support for rotatably supporting the end of the platen, and a rotatable support supporting the platen support so that the platen is allowed to move to and from the image sensor, the rotatable support disallowing the platen to move to and from the image sensor so that the platen is held in the state pressed against the image sensor, when the platen support is rotatively moved in a predetermined direction.

According to the above-described construction, the locking mechanism is constituted by the platen support provided at the end of the platen and the rotatable support. This construction can reduce the sizes of the component parts and accordingly, the spaces for the disposition of these component parts as compared with the conventional construction in which the shaft constituting the locking mechanism is transversely disposed along the platen. These reductions in the sizes of the component parts and the spaces therefor can reduce the overall size of the image reader. Furthermore, the platen support is supported by the rotatable support so as be allowed to move only in directions in which the platen is moved to and from the image sensor. The platen support is disallowed to move in these directions when rotatively moved in a predetermined direction. In this construction, when the platen support is moved in a direction opposite the predetermined direction with the platen being pressed against the image sensor, the platen is allowed to move in the directions in which the platen is moved to and from the image sensor. The component parts such as the image sensor can readily be cleaned when the platen is moved to depart from the image sensor in this state. Moreover, the platen can be returned to be pressed against the image sensor by an easy manipulation of rotating the platen support in the predetermined direction.

The above-described image reader preferably further comprises an isolating member moving the platen support so that when the platen support is movably supported by the rotatable support, the platen is held away from the image sensor. Additionally, the image reader preferably further comprises a cover provided over the platen to be opened and closed, the cover covering the platen when closed, and a lever provided on the platen support to be abutted against the cover when the cover is closed, thereby rotatively moving the platen support in the predetermined direction toward the image sensor.

The platen support preferably includes a generally elliptic or rectangular sliding member having lengthwise ends. The rotatable support preferably has a fitting hole into which the lengthwise ends of the sliding member are slidably fit, and an opening for opening the fitting hole outside so that when a direction of the length of the sliding member agrees with directions in which the platen is moved to and from the image sensor, the sliding member is moved in the directions in which the platen is moved to and from the image sensor. In this construction, the sliding member preferably has an abutment portion against which an opening end of the fitting hole is abutted, the abutment portion being formed into a curved shape depending upon a direction of rotative movement of the sliding member. Furthermore, when rotatively moved, the sliding member is preferably moved in such a direction that the sliding member is fitted into the fitting hole, with the abutment portion thereof being abutted against the opening end of the fitting hole.

The image reader further comprises a paper chute cover providing a feed passage along which an original is fed, the paper chute cover defining an upper limit of the movement of the platen support in the directions in which the platen is moved to and from the image sensor.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 1 is a perspective view of a platen support used in an image reader of one embodiment in accordance with the present invention;

FIG. 5 is a side view of the locking mechanism, showing the state in which a platen support stands;

DETAILED DESCRIPTION OF THE PREFERRED EMBODIMENT

Figure 2:
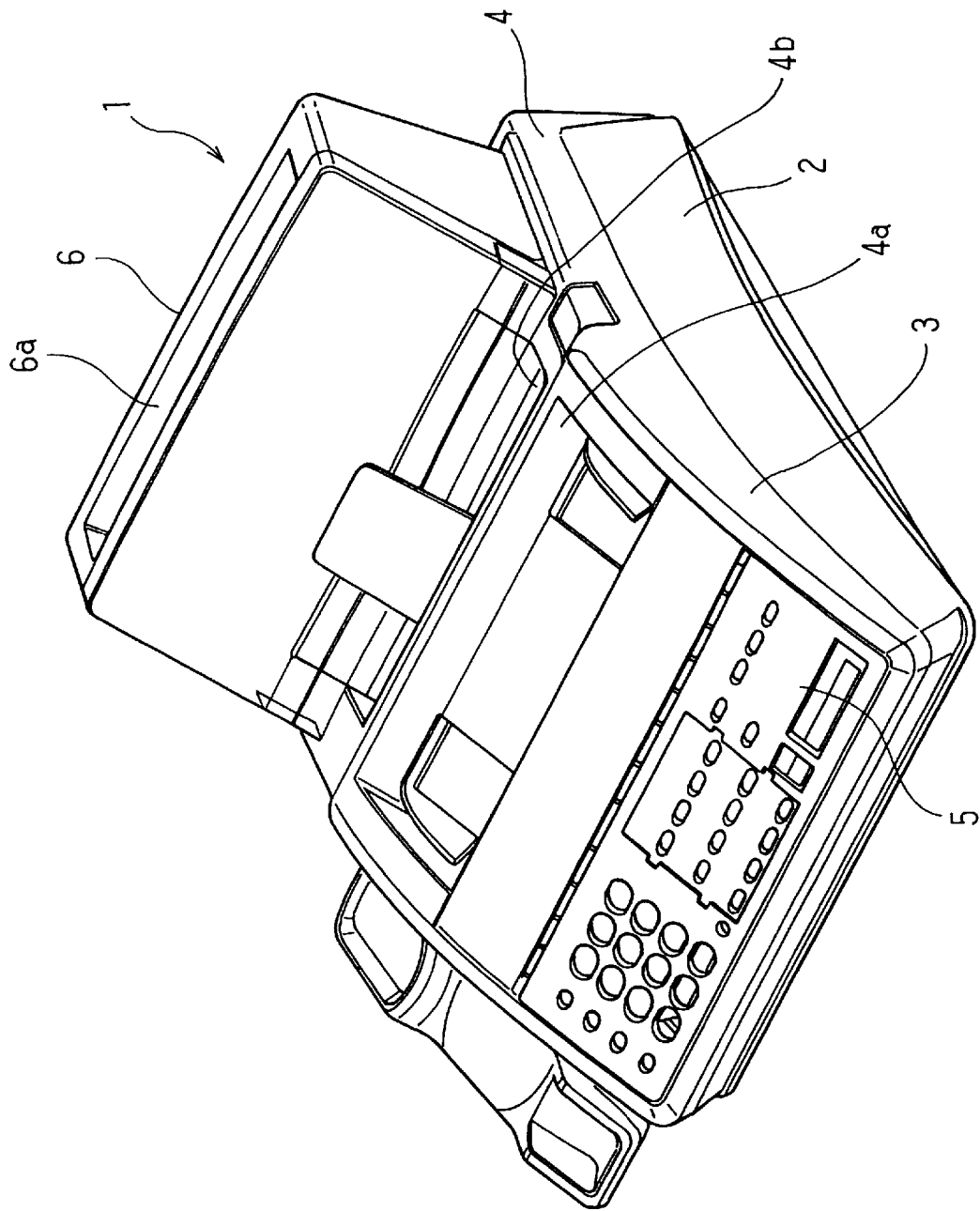
FIG. 2 is a perspective view of a facsimile machine incorporated with the image reader.
Figure 3:
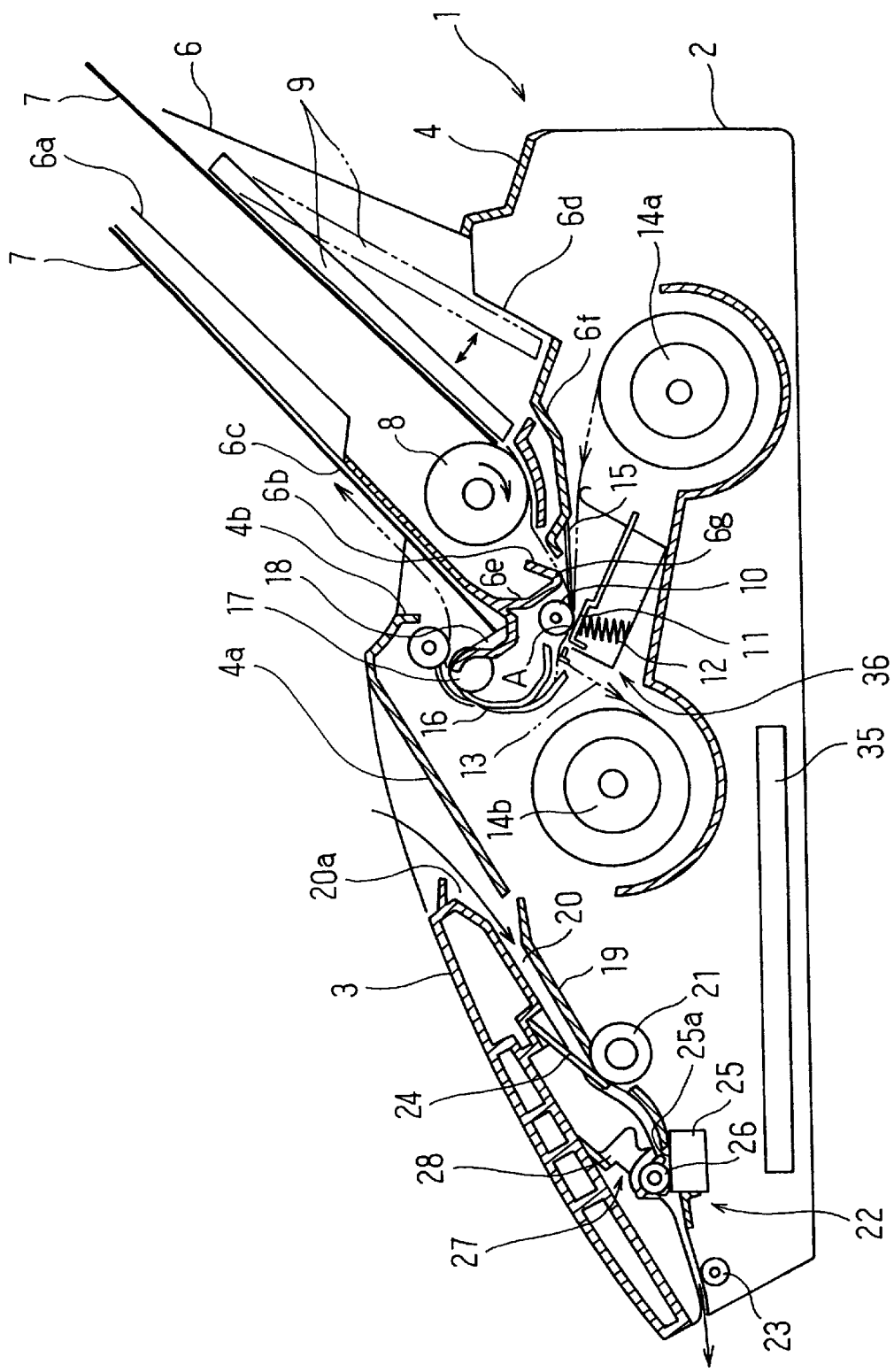
FIG. 3 is a schematic sectional view of the facsimile machine.

One embodiment of the present invention will be described with reference to the accompanying drawings. In the embodiment, the image reader of the invention is applied to a facsimile machine of the business use type. The image reader 22 is incorporated in the facsimile machine 1 as shown in FIG. 3. The facsimile machine 1 will first be described with reference to FIGS. 2 and 3. The facsimile machine 1 comprises an accommodation frame 2 constituting a lower casing. A panel cover 3 and a paper cover 4 for an original carrying image information to be transmitted are mounted respectively on the front and the rear of the frame 2 to be opened and closed. An operation panel 5 is mounted on the panel cover 3. The operation panel 5 includes input keys for telephone numbers, functions keys, etc. The paper cover 4 includes an original insertion guide 4a, a paper outlet 4b for discharging printed paper, and a paper retaining frame 6 accommodating a number of sheets of paper, disposed in this order from the front side.

The paper retaining frame 6 is formed with an upper paper inlet 6a and a lower paper inlet 6b communicating with the upper paper inlet 6a, as shown in FIG. 3. A paper feed roller 8 is rotatably mounted in the vicinity of the paper inlet 6b in the paper retaining frame 6. A paper support plate 9 is also provided in the paper retaining frame 6 for supporting sheets of paper 7. The paper support plate 9 is pivotally mounted at an upper end thereof so that a lower end thereof is rotatively moved to be adjacent the paper feed roller 8. The paper support plate 9 is further urged to be rotatively moved toward the paper feed roller 8. The paper feed roller 8 is rotated with the lower end of the paper 7 pressed against the roller 8 by the paper support plate 9 so that the sheets of paper 7 are fed one by one to the paper inlet 6b.

The paper inlet 6b includes a first guide section 6e and a second guide section 6f each disposed at an exit side thereof for guiding the paper 7 to a printing device 36. The first guide section 6e is formed by downwardly and rearwardly bending a lower end of a front wall 6c of the paper retaining frame 6 and then upwardly bending the lower end so that the first guide section 6e has a top 6g. The second guide section is formed by bending a lower end of a rear wall 6d of the paper retaining frame 6 forward (toward the first guide section 6e ) so that the second guide section 6f has a distal end positioned nearer to the rear wall 6d (the paper feed roller 8 side) than the top 6g of the first guide section 6e. The first and second guide sections 6e and 6f regulate a feed direction of the paper 7 by the top 6g of the first guide section 6e and the distal end of the second guide section 6f when the paper 7 is guided to the printing device 36. Consequently, the paper 7 is fed tangentially at a holding point A between a printing platen roller 10 and a print head 11 of the printing device 36.

The printing platen roller 10 and the print head 11 are transversely disposed in the direction of the width of the paper 7 or so as to be cross a direction of feed of the paper 7. The print head 11 has a printing face for printing on the entire range of the paper in the direction of the width thereof. The print head 11 is urged by a compression coil spring 12 to be pressed against the printing platen roller 10. The paper 7 is guided by the first and second guide sections 6e and 6f to be fed to the holding point A between the printing platen roller 10 and the print head 11. An ink ribbon 13 having a width approximately the same as that of the paper 7 is also fed to the holding point A. The ink ribbon 13 has an ink layer on one side thereof and is wound into a roll on an unwinding roller 14a provided at the rear of the holding point A. The ink ribbon 13, after being fed from the roller 14a, passes the holding point A at the lower side of the paper 7 or at the print head 11 side, thereafter being wound up on a winding roller 14b provided in front of the holding point A. The ink ribbon 13 is heated by the print head 11 at the holding point A so that image information is printed on the paper 7, as well known in the art.

A film member 15 is provided at the paper feed side with respect to the holding point A or on the left of the holding point A in FIG. 3 so as to be disposed between the paper 7 and the ink ribbon 13. The film member 15 has a width larger than the ink ribbon 13 and such a length that it extends from near the holding point A to the exit side of the paper inlet 6b. The film member 15 is disposed so that a distal end side thereof is located in the vicinity of the holding point A, thereby preventing contact between the paper 7 and the ink ribbon 13 as far as the holding point A. Consequently, the paper 7 is prevented from being soiled by the contact with the ink ribbon 13.

A paper discharge guide 16 is provided at the paper exit side with respect to the holding point A for guiding the paper 7 on which the image information has been printed. A pair of exit rollers 17 are also provided at the paper exit side for discharging the paper 7 outside the facsimile machine 1. These rollers 17 are located at the left-hand and right-hand ends of the paper outlet 4b in the direction of the width thereof respectively. The paper discharge guide 16 is curved in its portion between the holding point A side and the paper outlet 4b side to thereby guide the paper 7 to the outlet. The paper outlet 4b is defined by the front wall 6c of the paper retaining frame 6 and the original insertion guide 4a. The front wall 6c is inclined obliquely rearward to thereby serve as a paper support plate for supporting the paper 7 with one of the opposite sides thereof being located at the bottom side. A pair of support members 18 are provided on the bottom of the front wall 6c to be located in the vicinity of the paper discharge rollers 17 respectively. The support members 18 prevent the paper 7 from being inclined to the left or right. When the paper 7 is inclined to the left or right such that it is supported only by one of the support members 18, the gravity rotatively moves the paper 7 so that the paper is supported by both of the support members 18. Thus, the inclination of the paper 7 is automatically corrected.

The original insertion guide 4a forming the other face of the paper outlet 4b is inclined so that the front side thereof is located lower than the rear side thereof. As a result, the gravity moves the original forward or obliquely downward when the original is placed on the original insertion guide 4a. A paper chute cover 19 and the panel cover 3 are disposed in front of the original insertion guide 4a. The panel cover 3 is pivotally supported at its end at the guide 4a side as to be closed and opened. When closed, the panel cover 3 defines an original feed passage 20 together with the paper chute cover 19. The original insertion guide 4a, the paper chute cover 19 and the panel cover 3 also define an original insertion hole 20a serving as an entrance to the original feed passage 20. A feed roller 21, the image reader 22 and a paper discharge roller 23 are provided in the original feed passage 20 in this order from the hole 20a side. A separating strip 24 is pressed against the feed roller 21 so that a plurality of sheets of original paper, when inserted into the original insertion hole 20a, are fed one by one to the image reader 22.

The image reader 22 comprises an image sensor 25 further comprising a contact image sensor (CIS) and a reading platen roller 26 for reading the white used as a reference color. The image reading platen roller 26 constitutes a platen in the invention. The image sensor 25 may comprise a charge coupled device (CCD), instead. The image sensor 25 has an image reading face 25a having a width approximately the same as that of the original and reads images per line on the original, thereby delivering image information. The image sensor 25 is vertically movable and urged by a compression coil spring (not shown) toward the image reading platen roller 26.

Locking mechanisms 27 will now be described with reference to FIGS. 1 to 5. The locking mechanisms 27 are provided on both ends of the image reading platen roller 26 for pressing the platen roller against the image reading face 25a of the image sensor 25 and holding it in the pressed state, respectively. Since both locking mechanisms 27 have the same construction, one of them will be described. The locking mechanism 27 also has a function of holding the platen roller 26 away from the image reading face 25a. The locking mechanism 27 comprises a pair of platen supports 28 rotatably supporting both ends of the platen roller 26, and a pair of rotatable supports 32 for rotatably and vertically movably supporting the platen supports 28, respectively.

Figure 6:
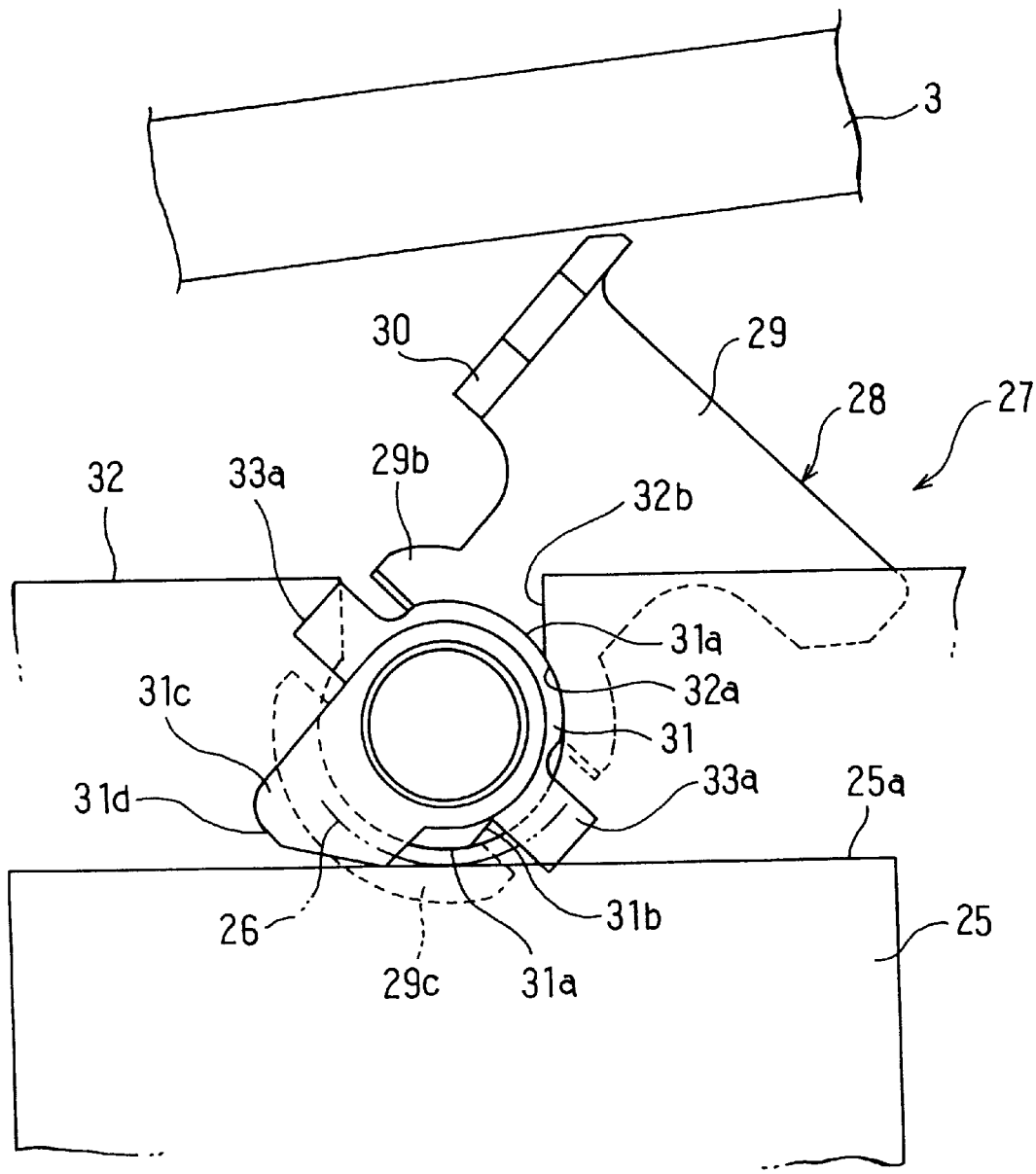
FIG. 6 is a side view of the locking mechanism, showing the state in which the platen support is inclined.

The rotatable support 32 is made of a steel plate, for example. The rotatable support 32 is formed with a generally circular fitting hole 32a and an opening 32b continuous to the fitting hole 32a so that the fitting hole opens at an upper end of the rotatable support 32, as shown in FIGS. 1, 5 and 6. The platen support 28 includes a plate-shaped support base 29 standing along the rotatable support 32, a lever 30 formed integrally on the upper front of the support base 29 so that the panel cover 3 is abutted thereagainst, and a sliding member 31 formed integrally on a lower portion of the support base 29 at the platen roller 26 side. The support base 29 has two, namely, front and rear, pairs of first and second holding portions 29b and 29c protruding therefrom to be located around the sliding member 31. The sliding member 31 is formed into a generally elliptic shape and has third holding portions 33a protruding from central front and rear portions thereof respectively. A clearance between the third holding portions 33a and the first and second holding portions 29b and 29c is set to be approximately equal to a thickness of the rotatable support 32. The rotatable support 32 is held between the third holding portions 33a and the first and second holding portions 29b and 29c so that the platen support 28 is fixed so as to be disallowed to move widthwise with respect to the rotatable support 32 or rightward and leftward as viewed in FIGS. 5 and 6.

The sliding member 31 has two generally semicylindrical curved faces 31a formed on the upper and lower peripheral portions thereof respectively. The sliding member 31 further has two planar passing faces 31b formed on the front and rear portions thereof so as to connect between front and rear ends of the curved faces 31a respectively. Each curved face 31a is formed into such a shape as to be slidingly or rotatively fitted into the fitting hole 32a of the rotatable support 32. Each passing face 31b is formed so as to pass through the opening 32b which is smaller than the diameter of the fitting hole 32a.

A cylindrical portion 31f protrudes from the platen roller 26 side of the sliding member 31. An isolating portion 31c downwardly protrudes from a lower peripheral portion of the cylindrical portion 31f as viewed in FIG. 1. The isolating portion 31c has a distal end 31d formed to be located below the front passing face 31b. The distal end 31d of the isolating portion 31c is abutted against the image reading face 25a of the image sensor 25 when the platen support 28 is caused to stand as shown in FIG. 5. Upon abutment of the distal end 31d against the image reading face 25a, the sliding member 31 and accordingly, the platen support 28 are raised, being moved from the fitting hole 32a to the opening 32b. Consequently, the platen roller 26 is held at a position away from the image sensor 25 by a predetermined distance. On the other hand, when the panel cover 3 is abutted against the lever 30 such that the platen support 28 is inclined as shown in FIG. 6, the sliding member 31 is fitted into the fitting hole 32a and then slid or rotatively moved therein so that the sliding member 31 and accordingly, the platen support 28 are held at respective lower limit positions. Consequently, the platen roller 26 is pressed against the image reading face 25a of the image sensor 25.

Figure 4:
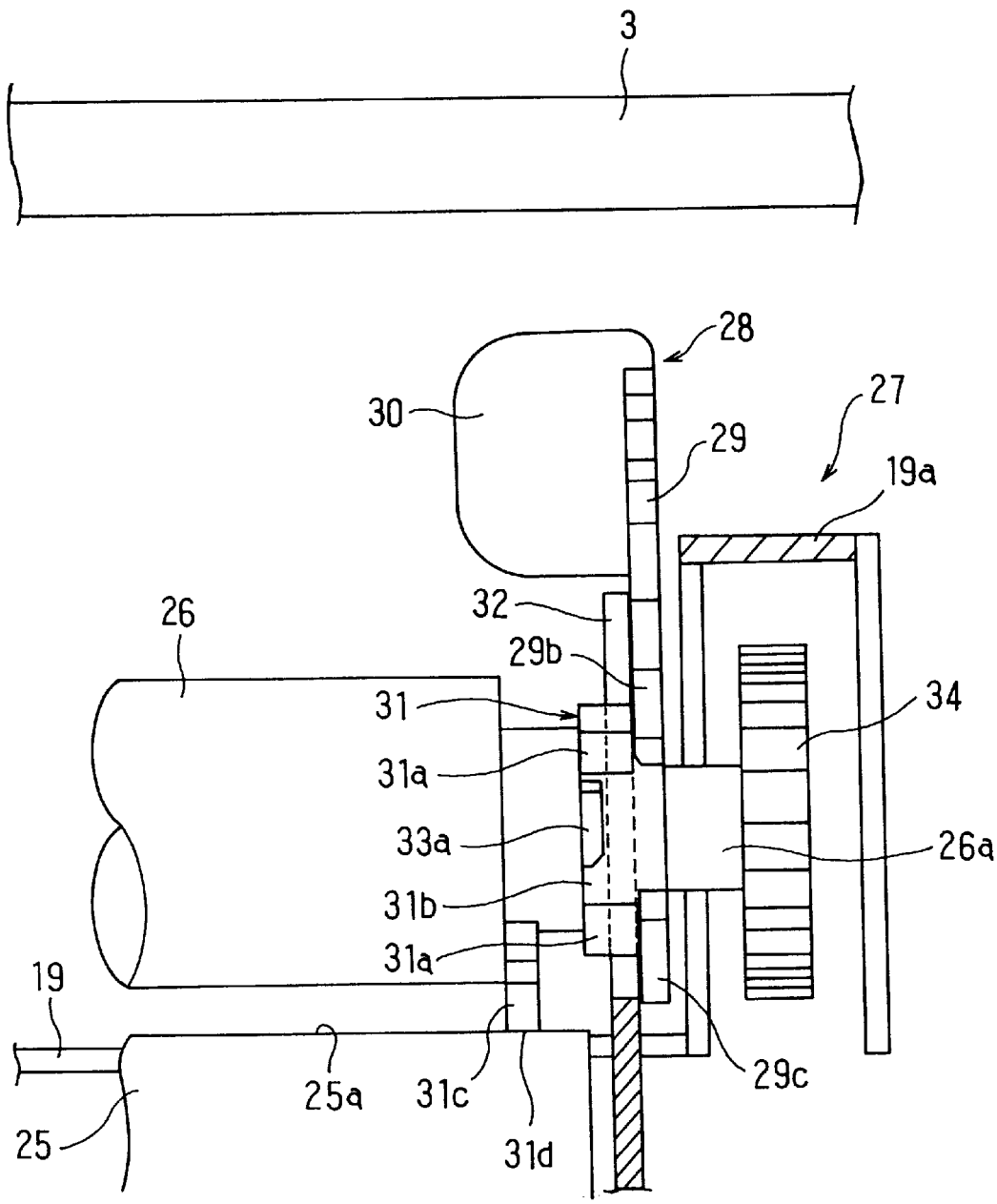
FIG. 4 is a front view of a locking mechanism of the image reader.

The sliding member 31 of the platen support 28 is formed with a through hole 31e. A support shaft 26a of the platen roller 26 rotatably extends through the hole 31e, as shown in FIG. 4. A platen roller gear 34 is fixed to one of the ends of the support shaft 26a for driving the platen roller 26. An end 19a of the above-described paper chute cover 19 extends over the platen roller gear 34 to cover the same. An opposite end of the paper chute cover 19 is further disposed to cover another platen roller gear 34 at the opposite side of the platen roller 26 although this is not shown in the drawings. Since no platen roller gear is provided at the opposite side, the end of the paper chute cover 19 at the opposite side is located lower than the end 19a thereof. When the image reading platen roller 26 or the platen support 28 is lifted upward by the operator, the platen roller gear 34 is abutted against the end 19a of the paper chute cover 19 and the other support shaft 26a is abutted against the end of the paper chute cover 19 at the opposite side, whereupon the sliding member 31 of the platen support 28 is prevented from falling off from the rotatable support 32.

The above-described platen roller gear 34, various gears (not shown), and a drive motor (not shown) constitute a drive mechanism for driving the paper feed roller 8, the printing platen roller 10, the unwinding roller 14a, the winding roller 14b, etc. as shown in FIG. 3. A control device 35 is provided on the bottom of the accommodation frame 2 for controlling the above-mentioned drive mechanism. The control device 35 controls the drive mechanism to thereby perform a process for reading images on the original by means of the image reader 22, a process for printing read image information on the paper 7 by means of the printing device 6, processes for transmitting and receiving the image information via a telephone line, etc.

The operation of the image reader 22 of the facsimile machine 1 will be described. First, when placed on the original insertion guide 4a and inserted into the original insertion hole 20a in the case of transmission of images, a plurality of sheets of original slide in the direction of arrow in FIG. 3. A first sheet of original is then fed by a predetermined amount toward the image reader 22 by the feed roller 21 and the separating strip 24. Subsequently, input keys etc. on the operation panel as shown in FIG. 2 are depressed so that an addressee's facsimile machine is called. The sender's facsimile machine is rendered transmissible upon receipt of a response from the addressee's facsimile machine. The feed roller 21 is then rotated to feed the original between the reading platen roller 26 and the image sensor 25 of the image reader 22. Pressed by the image sensor 25, the original is fed by the platen roller 26 so that the images on the original is sequentially read by the image sensor 25. Read image information is transmitted via the telephone line to the addressee's facsimile machine.

The platen roller 26 feeding the original is held in a state pressed against the image sensor 25 by the locking mechanism 27. More specifically, as shown in FIG. 6, when the platen support 28 of the locking mechanism 27 is pushed downward by the panel cover 3 or the like to be thereby inclined, the curved faces 31a of the sliding member 31 are rotated or slid, being fitted into the fitting hole 32a of the rotatable support 32. Consequently, since the fitting hole 32a disallows the sliding member 31 to move to the opening 32b side, the sliding member is held at the lower limit position. The platen roller 26 held at each end thereof by the platen support 28 is held at the lower limit position together with the sliding member 31 to be thereby abutted against the reading face 25a of the image sensor 25. Thus, the platen roller 26 is held in the state pressed against the image sensor 25. In this case, the positional relation between the original and the image sensor 25 is stabilized since the original is pressed by the platen roller 26. Consequently, a fine quality of image information can be obtained.

In cleaning the image sensor 25 or repair for paper clogging, the panel cover 3 covering the platen roller 26 is opened. When the operator lifts up the lever 30, the inclined platen support 28 is rotatively moved forward to thereby stand. As the result of the rotative movement of the platen support 28, the isolating portion 31c of the sliding member 31 is abutted against the reading face 25a of the image sensor 25, whereby the sliding member 31 is urged upward. The sliding member 31 is allowed to move upward from the fitting hole 32a into the opening 32b when the passing faces 31b of the sliding member 32 are aligned with the opening 32b of the rotatable support 32. Subsequently, the sliding member 31 is moved to its uppermost position to be held thereat when the top 31d of the isolating portion 31c is abutted against the reading face 25a of the image sensor 25 so that the platen support 28 is caused to stand. With this, the platen roller 26 is moved upward together with the sliding member 31 of the platen support 28 so that the platen roller 26 is held away from the reading face 25a of the image sensor 25. Consequently, cleaning the reading face 25c and repair for paper clogging can readily be carried out with both hands.

In the cleaning of the image sensor 25 or repair for paper clogging, the platen roller gear 34 mounted on the support shaft 26a of the platen roller 26 is abutted against the end 19a of the paper chute cover 19 when the platen support 28 or the platen roller 26 is lifted up. Thus, the sliding member 31 of the platen support 26 can be prevented from falling off from the rotatable support 32. Furthermore, the detachment of the platen roller 26 is disallowed. Consequently, troublesome mounting of the platen support 28 on the rotatable support 32 is not required after the cleaning or repair.

Subsequently, the lever 30 of the platen support 28 is operated upon completion of the cleaning or the like so that the platen support 28 standing is inclined as shown in FIG. 6. In this case, the lever 30 is first moved downward until the sliding member 31 is moved to the lower limit position where the sliding member is fitted into the fitting hole 32a. When the lever 30 is then rotatively moved, the curved faces 31a of the sliding member 31 are rotatively moved or slid smoothly, being fitted into the fitting hole 32a. Consequently, the sliding member 31 is held in the fitting hole 32a, and the platen roller 26 is held in the state pressed against the image sensor 25.

Figure 7:
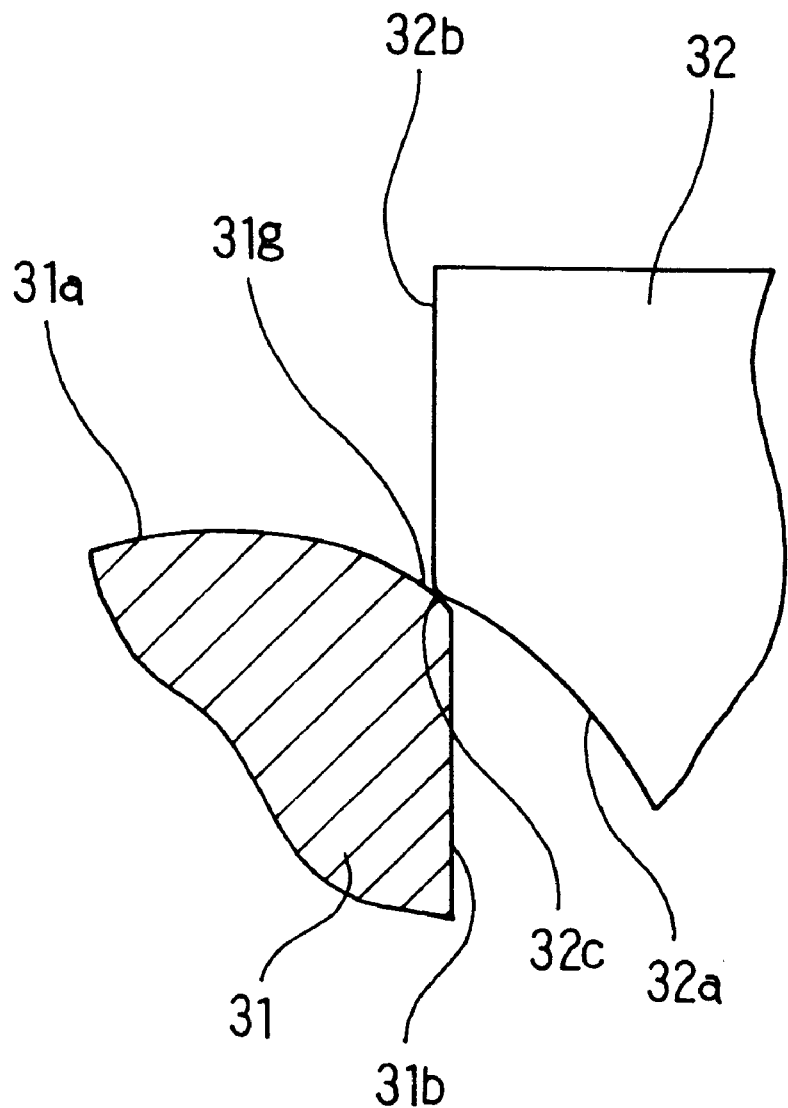
FIG. 7 is a partial side view of a sliding member of the platen support and a fit hole of a rotatable support.

In the foregoing embodiment, the platen support 28 can also be rotatively moved smoothly from the standing state to the inclined state even when the lever 30 is rotatively moved from the first without downward movement. For this purpose, the sliding member 31 includes an abutment portion 31g which is abutted against the lower end 32c of the opening 32b when the platen support 28 is standing and the platen roller 26 is held away from the reading face 25a of the image sensor 25 by a predetermined distance, as shown in FIG. 7. The abutment portion 31g is formed into a curved shape depending upon the direction of rotative movement of the sliding member 31. More specifically, the abutment portion 31g is formed into the shape of an arc having a curvature slightly smaller than an arc of the fitting hole 32a. In this shape of the abutment portion 31g, the sliding member 31 is smoothly moved downward or in the direction in which the sliding member is fitted into the fitting hole 32a, with the abutment portion 31g being abutted against the end 32c of the opening 32b of the fitting hole 32a, as shown in FIG. 7. When the sliding member 31 is moved to the lower limit position to be fitted in the fitting hole 32a, the curved faces 31a of the sliding member 31 are rotatively moved smoothly thereafter, being fitted in the fitting hole 32a. The sliding member 31 is thus fitted in the fitting hole 32a to be held in the inclined state when the lever 30 of the platen support 28 is rotatively moved with a relatively small force being applied thereto. Consequently, an improved operability can be achieved.

In the foregoing embodiment, closing the panel cover 3 automatically inclines the platen support 28 even if the lever 30 of the platen support 28 is left non-operated upon completion of the cleaning or repair. More specifically, the panel cover 3 abuts against the upper portion of the lever 30 to thereby push the same when closed with the platen support 28 standing, as shown in FIG. 6. As a result, the platen support 28 is rotatively moved downward to be thereby inclined. Since the abutment portion 31g is formed into the curved shape depending upon the direction of rotative movement as described above, the sliding member 31 is smoothly fitted into the fitting hole 32a and rotatively moved even when a force the panel cover 3 applies to the lever 30 is small. The sliding member 31 is held in the fitting hole 32a such that the platen roller 26 is held in the state pressed against the image sensor 25. In the above-described construction, the platen supports 28 provided on both ends of the platen roller 26 can be inclined simultaneously when the panel cover 3 is closed. Consequently, the operability of the image reader 22 can further be improved.

As described above, the image reader 22 comprises the locking mechanisms 27 each holding the platen roller 26 so that the platen roller can be lowered to and raised from the image sensor 25 and further holding the platen roller 26 in the state pressed against the image sensor 25, as shown in FIG. 1. Each locking mechanism 27 comprises the platen support 28 rotatably supporting each one end of the platen roller 26 and the rotatable support 32 supporting the platen support 28 so that the platen roller 26 is allowed to be lowered to and raised from the image sensor 25. The rotatable support 32 further disallows the platen roller 26 to be lowered to and raised from the image sensor 25 and holds the platen roller 26 in the pressed state when the platen support 28 has been rotatively moved rearward.

According to the above-described construction, each locking mechanism 27 is constituted by the platen support 28 and the rotatable support 32. The above-described construction can reduce the sizes of component parts of the locking mechanism and spaces for disposition of the component parts as compared with the conventional construction in which the locking mechanism includes a shaft mounted on both ends of the platen roller and extending along the platen roller. Consequently, the overall size of the image reader and accordingly the facsimile machine can be reduced. Furthermore, the panel cover 3 (cover) covering the platen roller 26 can be opened and closed. The platen support 28 includes the lever 30 abutted against the panel cover 3 when the latter is closed, so that the platen support 28 is rotatively moved rearward toward the image sensor 25 by the lever 30. Consequently, the sliding member 31 of the platen support 28 is fitted into the fitting hole 32a of the rotatable support 32 to be held therein. Since closing the panel cover 3 and re-pressing the platen roller 26 against the image sensor 25 can simultaneously be performed, the operability of the image reader can further be improved.

The platen support 28 includes the sliding member 31 having the curved faces 31a formed at the longitudinal ends thereof and the passing faces 31b formed at ends in the direction of the width thereof. The rotatable support 32 has the fitting hole 32a into which the longitudinal ends or curved faces 31a of the sliding member 31 are slidably fitted, and the opening 32b opening the fitting hole 32a outward so that the sliding member 31 is allowed to move, when the direction of the length of the sliding member 31 agrees with the directions in which the platen roller 26 is lowered or moved to and raised or moved from the image sensor 25. The direction of the length refers to the direction of an imaginary line connecting between the tops of the curved faces 31a. The direction of the width refers to the direction perpendicular to the passing faces 31b. The sliding member 31 may be substantially elliptic or rectangular provided that it has the lengthwise ends and the widthwise ends. When the sliding member 31 is formed into the rectangular shape, for example, the fitting hole may be formed with a groove in which the sliding member is slidable widthwise. Since each of the platen support 28 and the rotatable support 32 has a simple shape in this construction, the locking mechanism 27 can readily be manufactured and inspected. Furthermore, since the sliding member 31 has the abutment portion 31g formed into the curved shape depending upon the direction of the rotative movement, the platen support 28 can smoothly be rotatively moved by application of a small force thereto so as to be fitted into the fitting hole 32a of the rotatable support 32 to be held therein.

Although the platen support 28 is rotatively moved rearward in the foregoing embodiment, it may be rotatively moved forward, sideways or in another direction. Furthermore, although the sliding member 31 of the platen support 28 has the isolating portion 31c, it may or may not be provided. When the isolating portion 31c is eliminated, the operator can clean the image sensor 25 or recover the image reader from paper clogging with one hand while lifting up and holding the platen roller 26 with the other hand.

Although the platen roller 26 is raised from and lowered to the image sensor 25 in the foregoing embodiment, the platen roller may be movable in any direction provided that it is moved to and from the image sensor 25. Additionally, although the image reader 22 is incorporated in the business use type facsimile machine in the foregoing embodiment, it may be incorporated in copying machines, printers, etc.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. An image reader comprising:

an image sensor;

a platen movable to and from the image sensor and having an end; and a locking mechanism capable of holding the platen in a state pressed against the image sensor, the locking mechanism including:

a platen support for rotatably supporting the end of the platen; and a rotatable support rotatably supporting the platen support so that the platen is allowed to move to and from the image sensor, only when the platen support assumes a predetermined rotational position, the rotatable support disallowing the platen to move to and from the image sensor so that the platen is held in the state pressed against the image sensor, when the platen support is rotatively moved in a predetermined direction.

2. An image reader according to claim 1, further comprising an isolating member moving the platen support so that when the platen support is movably supported by the rotatable support, the platen is held away from the image sensor.

3. An image reader according to claim 2, further comprising a cover provided over the platen to be opened and closed, the cover covering the platen when closed, and a lever provided on the platen support to be abutted against the cover when the cover is closed, thereby rotatively moving the platen support in the predetermined direction toward the image sensor.

4. An image reader according to claim 2, wherein the platen support includes a generally elliptic or rectangular sliding member having lengthwise ends, and the rotatable support has a fitting hole into which the lengthwise ends of the sliding member are slidably fit, and an opening for opening the fitting hole outside so that when a direction of the length of the sliding member agrees with directions in which the platen is moved to and from the image sensor, the sliding member is moved in the directions in which the platen is moved to and from the image sensor.

5. An image reader according to claim 4, wherein the sliding member has an abutment portion against which an opening end of the fitting hole is abutted, the abutment portion being formed into a curved shape depending upon a direction of rotative movement of the sliding member, and wherein when rotatively moved, the sliding member is moved in such a direction that the sliding member is fitted into the fitting hole, with the abutment portion thereof being abutted against the opening end of the fitting hole.

6. An image reader according to claim 2, further comprising a paper chute cover providing a feed passage along which an original is fed, the paper chute cover defining an upper limit of the movement of the platen support in the directions in which the platen is moved to and from the image sensor.

7. An image reader according to claim 1, further comprising a cover provided over the platen to be opened and closed, the cover covering the platen when closed, and a lever provided on the platen support to be abutted against the cover when the cover is closed, thereby rotatively moving the platen support in the predetermined direction toward the image sensor.

8. An image reader according to claim 7, wherein the platen support includes a generally elliptic or rectangular sliding member having lengthwise ends, and the rotatable support has a fitting hole into which the lengthwise ends of the sliding member are slidably fit, and an opening for opening the fitting hole outside so that when a direction of the length of the sliding member agrees with directions in which the platen is moved to and from the image sensor, the sliding member is moved in the directions in which the platen is moved to and from the image sensor.

9. An image reader according to claim 8, wherein the sliding member has an abutment portion against which an opening end of the fitting hole is abutted, the abutment portion being formed into a curved shape depending upon a direction of rotative movement of the sliding member, and wherein when rotatively moved, the sliding member is moved in such a direction that the sliding member is fitted into the fitting hole, with the abutment portion thereof being abutted against the opening end of the fitting hole.

10. An image reader according to claim 1, wherein the platen support includes a generally elliptic or rectangular sliding member having lengthwise ends, and the rotatable support has a fitting hole into which the lengthwise ends of the sliding member are slidably fit, and an opening for opening the fitting hole outside so that when a direction of the length of the sliding member agrees with directions in which the platen is moved to and from the image sensor, the sliding member is moved in the directions in which the platen is moved to and from the image sensor.

11. An image reader according to claim 10, wherein the sliding member has an abutment portion against which an opening end of the fitting hole is abutted, the abutment portion being formed into a curved shape depending upon a direction of rotative movement of the sliding member, and wherein when rotatively moved, the sliding member is moved in such a direction that the sliding member is fitted into the fitting hole, with the abutment portion thereof being abutted against the opening end of the fitting hole.

* * * * *